(12) United States Patent
Gangloff et al.

(10) Patent No.: US 10,580,046 B2
(45) Date of Patent: Mar. 3, 2020

(54) PROGRAMMATIC GENERATION AND OPTIMIZATION OF ANIMATION FOR A COMPUTERIZED GRAPHICAL ADVERTISEMENT DISPLAY

(71) Applicant: Criteo SA, Paris (FR)

(72) Inventors: Antoine Gangloff, Paris (FR); Sami Touil, Paris (FR); Hugo Kaczmarek, Paris (FR); Thomas Delayen, Chaville (FR)

(73) Assignee: Criteo S.A., Paris (FR)

( * ) Notice: Subject to any disclaimer, the term of this patent is extended or adjusted under 35 U.S.C. 154(b) by 316 days.

(21) Appl. No.: 15/787,641

(22) Filed: Oct. 18, 2017

(65) Prior Publication Data

US 2019/0114679 A1      Apr. 18, 2019

(51) Int. Cl.
*G06F 17/30* (2006.01)
*G06F 3/0484* (2013.01)
*G06Q 30/02* (2012.01)
*G06T 13/80* (2011.01)

(52) U.S. Cl.
CPC ..... *G06Q 30/0276* (2013.01); *G06Q 30/0269* (2013.01); *G06Q 30/0277* (2013.01); *G06T 13/80* (2013.01)

(58) Field of Classification Search
USPC ............................................. 705/14; 707/732
See application file for complete search history.

(56) References Cited

U.S. PATENT DOCUMENTS

| 2013/0138643 A1* | 5/2013 | Ramanathan | G06F 16/3322 707/732 |
| 2016/0110063 A1* | 4/2016 | Connolly | G06F 3/0482 715/716 |

* cited by examiner

*Primary Examiner* — Afaf Osman Bilal Ahmed
(74) *Attorney, Agent, or Firm* — Proskauer Rose LLP

(57) ABSTRACT

A computer receives a request for graphical display source code for a computerized graphical advertisement display, and retrieves seed animations including a plurality of seed animation features. The computer generates candidate animations based on the one or more seed animations, where the computer alters a first aspect of a seed animation to generate an altered seed animation having a plurality of altered seed animation features and the computer alters a second aspect of the altered seed animation to generate a candidate animation having a plurality of candidate animation features. The computer generates candidate animation scores based upon a context of the advertisement display and the plurality of candidate animation features. The computer selects an animation from the candidate animations based on the candidate animation scores and generates the graphical display source code based on the selected animation, a size of the advertisement display, and display capabilities of the user device.

30 Claims, 3 Drawing Sheets

PROGRAMMATIC GENERATION AND OPTIMIZATION OF ANIMATION FOR A COMPUTERIZED GRAPHICAL ADVERTISEMENT DISPLAY

TECHNICAL FIELD

The present technology relates to the generation of graphical display source code for a computerized graphical advertisement display, and, more particularly, to the generation and optimization of animation displayed within a computerized graphical advertisement display.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display. The graphical display source code can include animated content displayed as part of the advertisement. In some systems, the animation or animations used for computerized graphical advertisement displays are not customizable based upon the context of the graphical advertisement display. This can result in ad systems using animations for computerized graphical advertisement displays that are not tailored for display on a particular user device, within a particular application, for a particular user—and further tailored according to the publisher context.

SUMMARY

Accordingly, there is a need for technology to dynamically generate animations to be included in computerized graphical advertisement displays based upon computer-generated characteristics. The technology described herein beneficially provides computerized graphical advertisement displays with animations that are tailored for display on a particular user device, within a particular application, for a particular user—and further tailored according to the publisher context.

In one aspect, there is a computer-implemented method of generating graphical display source code for a computerized graphical advertisement display. A computing device receives, from a user device, a request for the graphical display source code for the computerized graphical advertisement display. The computing device retrieves one or more seed animations, each seed animation of the one or more seed animations including a plurality of associated seed animation features. The computing device generates a plurality of candidate animations based on at least the one or more seed animations, where the computing device alters a first aspect of a seed animation to generate an altered seed animation having a plurality of associated altered seed animation features and the computing device alters a second aspect of the altered seed animation in view of the altered first aspect to generate a candidate animation having a plurality of associated candidate animation features. The computing device determines a context associated with the computerized graphical advertisement display. The computing device generates a plurality of candidate animation scores, each candidate animation score of the plurality of candidate animation scores associated with a candidate animation of the plurality of candidate animation and each candidate animation score based upon the context and the plurality of associated candidate animation features. The computing device selects an animation from the plurality of candidate animations based on the plurality of candidate animation scores. The computing device generates the graphical display source code based on the selected animation, a layout description of the computerized graphical advertisement display, and one or more display capabilities of the user device. The computing device provides, to the user device, the graphical display source code.

In another aspect, there is a computerized system for generating graphical display source code for a computerized graphical advertisement display. A computing device receives, from a user device, a request for the graphical display source code for the computerized graphical advertisement display. The computing device retrieves one or more seed animations, each seed animation of the one or more seed animations including a plurality of associated seed animation features. The computing device generates a plurality of candidate animations based on at least the one or more seed animations, where the computing device alters a first aspect of a seed animation to generate an altered seed animation having a plurality of associated altered seed animation features and the computing device alters a second aspect of the altered seed animation in view of the altered first aspect to generate a candidate animation having a plurality of associated candidate animation features. The computing device determines a context associated with the computerized graphical advertisement display. The computing device generates a plurality of candidate animation scores, each candidate animation score of the plurality of candidate animation scores associated with a candidate animation of the plurality of candidate animation and each candidate animation score based upon the context and the plurality of associated candidate animation features. The computing device selects an animation from the plurality of candidate animations based on the plurality of candidate animation scores. The computing device generates the graphical display source code based on the selected animation, a layout description of the computerized graphical advertisement display, and one or more display capabilities of the user device. The computing device provides, to the user device, the graphical display source code.

Any of the above aspects can include one or more of the following features. In some embodiments, the user device renders the graphical display source code to display the computerized graphical advertisement display. In some embodiments, the graphical display source code comprises one or more of HTML, JAVASCRIPT, CSS, XML, or server-side rendered outputs. In some embodiments, the plurality of associated seed animation features of a seed animation includes one or more of: animation duration, size of animated element, location of animated element, animation frame count, movement direction of animated element, animation metadata, or animation easing.

In some embodiments, altering the animation duration of a seed animation of the one or more seed animations comprises one or more of: scaling up the animation duration, adding one or more keyframes to the seed animation, or appending animation duration to the seed animation. In some embodiments, appending animation duration to the seed animation comprises one or more of: adding animation duration to the beginning of the seed animation, adding animation duration to the end of the seed animation, or adding animation duration between one or more keyframes of the seed animation. In some embodiments, altering the animation duration of a seed animation of the one or more seed animations comprises one or more of: removing one or more animated elements from the seed animation, scaling down the animation duration, merging one or more animated elements in the seed animation, cropping one or more animated elements in the seed animation, or converting one or more animated elements in the seed animation from a first element type to a second element type. In some embodiments, an element type is a graphical element with associated data, such as image, text, video, container, and/or shape.

In some embodiments, generating a plurality of candidate animation scores comprises generating metadata associated with each candidate animation of the plurality of candidate animations, and determining the candidate animation score for each candidate animation based upon the generated metadata for the candidate animation. In some embodiments, the generated metadata includes exhaustive metadata associated with all characteristics of the candidate animation. In some embodiments, generating metadata associated with each candidate animation of the plurality of candidate animations comprises sampling one or more instants from the candidate animation, and generating the metadata based upon the sampled instants. In some embodiments, the computing device combines at least a portion of the generated metadata and at least a portion of the sampled metadata. In some embodiments, the one or more instants are sampled from the candidate animation at predetermined time intervals. In some embodiments, the metadata is generated by determining one or more differences between the sampled instants. In some embodiments, the sampled metadata is optimized based upon one or more of the exhaustive metadata and the generated metadata.

In some embodiments, the context comprises one or more of: a layout description for the computerized graphical advertisement display, a time constraint associated with the computerized graphical advertisement display, a size of the computerized graphical advertisement display, or an application associated with the computerized graphical advertisement display. In some embodiments, generating the plurality of candidate animations based on at least the one or more seed animations comprises excluding one or more candidate animations based on a pre-determined constraint on an associated candidate animation feature. In some embodiments, generating the plurality of candidate animations based on at least the one or more seed animations comprises excluding one or more candidate animations by random sampling. In some embodiments, generating the plurality of candidate animations based on at least the one or more seed animations comprises excluding one or more candidate animations based on predicted candidate animation scores associated with the one or more candidate animations.

In some embodiments, generating the plurality of candidate animation scores comprises generating the candidate animation score for a candidate animation based on one or more of: a predicted probability of interaction by a user with a computerized graphical advertisement display that includes the candidate animation, an expected sales amount associated with the candidate animation, an expected advertiser margin associated with the candidate animation, or an expected value associated with the candidate animation. In some embodiments, the interaction by a user with the computerized graphical advertisement display based on the candidate animation is a click on the computerized graphical advertisement display based on the candidate animation.

In some embodiments, generating the plurality of candidate animation scores comprises generating the candidate animation score for a candidate animation based on one or more of a display context for the computerized graphical advertisement display, historical performance data for the candidate animation, behavioral data for a user associated with the user device, one or more recommended products for display in the computerized graphical advertisement display, a temporal context for the computerized graphical advertisement display, and a geographical context for the computerized graphical advertisement display.

In some embodiments, selecting an animation from the plurality of candidate animations based on the plurality of candidate animation scores comprises selecting an animation from the plurality of candidate animations having an animation duration that corresponds to a duration of the computerized graphical advertisement display. In some embodiments, selecting an animation from the plurality of candidate animations based on the plurality of candidate animation scores comprises selecting an animation from the plurality of candidate animations having a highest candidate animation score of the plurality of candidate animation scores. In some embodiments, selecting an animation from the plurality of candidate animations based on the plurality of candidate animation scores comprises selecting an animation from the plurality of candidate animations having a candidate animation score lower than a highest candidate animation score of the plurality of candidate animation scores. In some embodiments, selecting an animation from the plurality of candidate animations based on the plurality of candidate animation scores comprises selecting an animation from the plurality of candidate animations based on sampling a subset of the plurality of candidate animations, where the subset is determined based on the plurality of candidate animation scores.

In some embodiments, the computing device alters one or more characteristics of the selected animation, wherein the one or more characteristics are independent of the size of the computerized graphical advertisement display and position-independent, based on one or more of a display context for the computerized graphical advertisement display, historical performance data for the selected animation, behavioral data for a user associated with the user device, one or more recommended products for display in the computerized graphical advertisement display, a temporal context for the computerized graphical display, and a geographical context for the computerized graphical display. In some embodiments, one or more candidate animations of the plurality of candidate animations are generated by the computing device altering one or more of the plurality of associated candidate animation features of a second candidate animation of the plurality of candidate animations.

In some embodiments, retrieving one or more seed animations comprises selecting one or more seed animations based on the one or more display capabilities of the user device. In some embodiments, the computing device selects a second animation from the plurality of candidate animations based on the plurality of candidate animation scores, generates second graphical display source code based on the second animation, the layout description of the computerized graphical advertisement display, and the one or more display capabilities of the user device, and provides, to the user device, the second graphical display source code.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for the computerized generation of graphical display source code for computerized graphical advertisement displays. In some embodiments, the technology can provide improved computerized graphical advertisement displays by generating displays with customized, context-specific animations that are optimized for the particular computing device on which the computerized graphical advertisement display will be rendered, as well as for a user of the computing device and for a publisher context. Beneficially, the technology can programmatically generate varied candidate animations for the computerized graphical advertisement display using a series of progressive mutations of a seed animation, and select a candidate animation from the candidate animations for use in generating the graphical display source code for the computerized graphical advertisement display.

Although the technology is illustrated and described herein with reference to specific embodiments, the technology is not intended to be limited to the details shown. Various modifications can be made in the details within the scope the claims and without departing from the technology.

Figure 1:
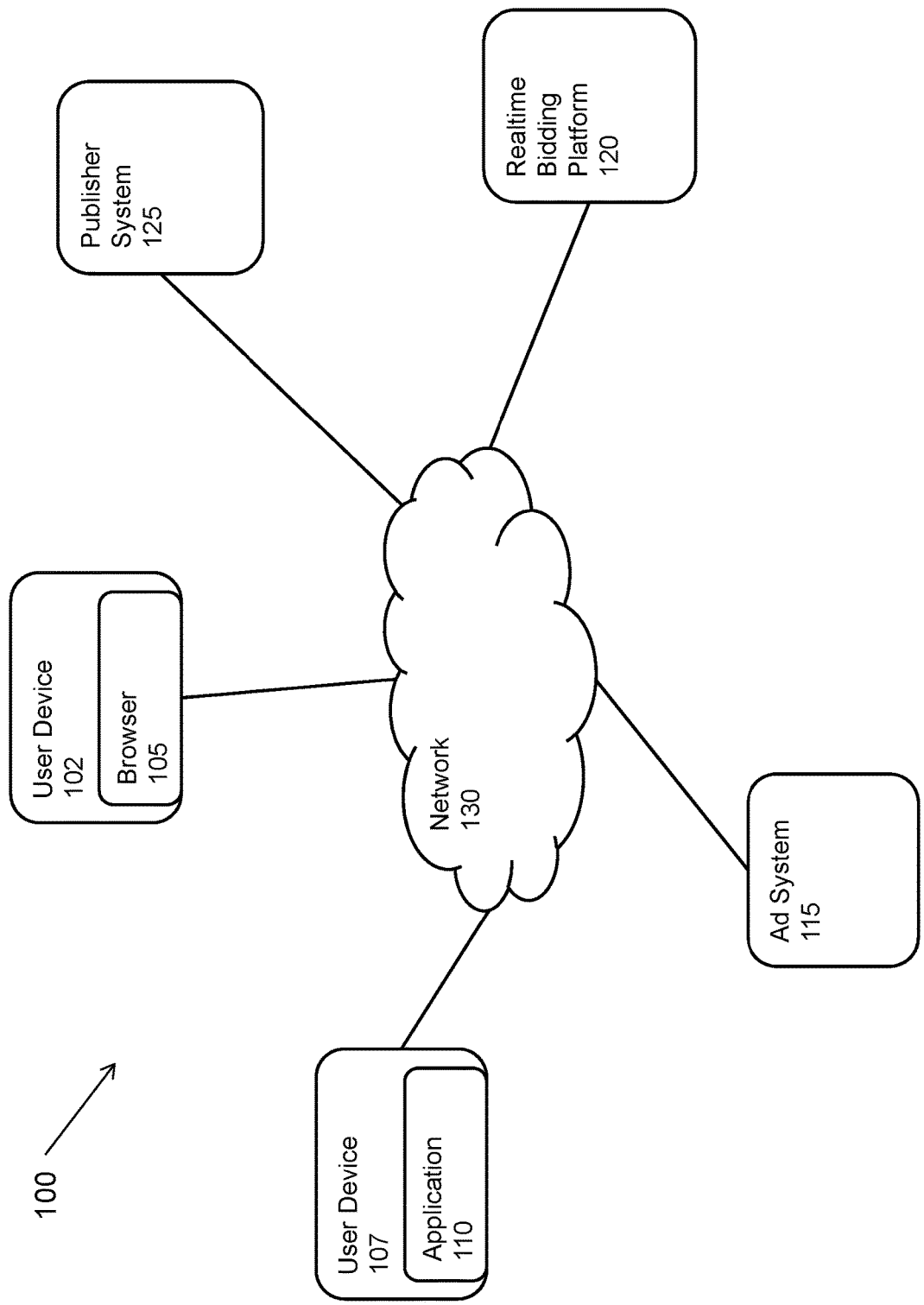
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, realtime bidding ("RTB") platform 120, and publisher system 125. User device 102, user device 107, ad system 115, RTB platform 120, and publisher system 125 can be in data communication via network 130. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Ad system 115 can be any computing device, such as a server or multiple servers. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content. Network 130 can be any network or multiple networks. For example, network 140 can include cellular networks through which user devices 102 and 107 are connected and the Internet.

The present technology provides systems and methods for the computerized generation of graphical display source code using customized, context-specific animations created by programmatically mutating seed animations. Generally speaking, the system described herein can receive a seed animation (or multiple seed animations) that depicts an item to be displayed in a graphical advertisement display, such as a product. For example, the seed animation may contain multiple concurrent or sequential animations on various graphical elements contained therein. The seed animation can take the form of an XML or JSON file with associated assets, such as: JPEG, GIF, MP4, Javascript code using HTML5 Canvas/SVG Animations/CSS animations/FLV, and the like. The seed animations can be source animations, or mutated animations that the system has previously generated either offline or in real time. Each seed animation can have certain features and attributes, including but not limited to: animation duration, size of animated element, location of animated element, animation frame count, movement direction of animated element, animation metadata, or animation easing. The system can apply a series of mutations to a seed animation in order to generate a plurality of different animations (also called candidate animations) that can have different features and attributes from the seed animation. A mutation is an operation that can be applied to an animation to generate one or more new animations. For example, the mutation can include operations such as altering the animation duration, including scaling up the animation duration, adding one or more keyframes to the seed animation, or appending animation duration to the seed animation. In this example, the computerized graphical advertisement display may have a constraint associated with the duration of an animation that can be used (e.g., a maximum or minimum limit on the duration). The ad system can use the techniques described above (e.g., keyframe removal, downscaling) to increase or decrease the duration of the seed animation and generate an intermediate animation or candidate animation that is longer or shorter than the seed animation—in order to meet the duration constraint.

In another example, the mutation can include operations such as applying one or more easing functions to the animation, including defining a type of easing function to be applied to at least a portion of the animation and assigning a time value at which the easing function(s) are applied to the animation. Generally, an easing function is a speed curve at which a transition from a first state of the animation to a second state of the animation is happening. In another example, the mutation can include altering the size, position, and/or visual nature of one or more animated elements in the animation—such as defining area, position, angle, opacity, and the like. The mutation may include operations such as cropping the animated element, applying a filter to the animated element, making the animated element fit to and/or fill a predetermined space, and so forth. The mutation may include operations such as swapping two different animations and/or animated elements (e.g., so that they animate in different orders or sequences), reversing the movement of an animation (e.g., clockwise to counterclockwise), duplicating an animation so the animation executes more than once, and other similar operations.

It should be appreciated that the system can apply further mutations to an already-mutated animation to generate a new animation that incorporates the additional mutations. As such, the system can apply a plurality of mutations to an animation (e.g., in a sequence) to generate a wide array of different candidate animations. In addition, because the combination of a plurality of mutations may not be commutative, the mutations can be applied in different sequences to a seed animation to generate different animations—for example, changing the easing function applied to a seed animation first, then merging the seed animation with another animation may not generate the same new animation as merging the seed animation with another animation first, then changing the applied easing function.

The system can analyze the features of each of the candidate animations to generate a corresponding candidate animation score. In some embodiments, the candidate animation score is based upon one or more of the candidate animation features and a context of the computerized graphical advertisement display in which the candidate animation will be featured. For example, the context can include characteristics such as a layout description for the computerized graphical advertisement display, a placement of the computerized graphical advertisement display on a website (e.g., in-feed, pre-roll, mid-roll, post-roll), an application associated with the computerized graphical advertisement display, or one or more features of a user associated with the request for the graphical advertisement display. In some embodiments, the system can use predictive and/or historical data relating to the context in order to generate the score for a candidate animation. The predictive and/or historical data can include data elements such as a predicted probability of interaction by a user with a computerized graphical advertisement display that includes the candidate animation, an expected sales amount associated with the candidate animation, and an expected value associated with the candidate animation. It should be appreciated that the context and the predictive and/or historical data can relate to additional characteristics such as the publisher of the advertisement display, the advertiser, and so forth—and the system can use these additional characteristics when generating the animation score.

The system can extract animation features from the seed animations, any intermediate mutated animations, and/or the candidate animations in order to generate a score for the respective animations. In addition, the extracted features can be used by the system to filter animations that may be similar—for example, if one or more features of two different candidate animations are very similar, the system may determine that only one of the candidate animations should be kept for possible insertion into a graphical advertisement display. In another example, the system can determine that a random subset of candidate animations should be kept.

It should further be appreciated that the system may not render the candidate animations and/or the intermediate altered animations during the process described herein. Instead, in some embodiments, the system can render only the candidate animation(s) that are selected for insertion into a graphical advertisement display. In addition, in some embodiments the system can determine or estimate metadata associated with a candidate animation and/or intermediate altered animation without having to actually render the animation itself—so the scoring could occur without requiring an animation to render. As a result, the system can utilize fewer computing resources when generating candidate animations and provide a more efficient animation generation and scoring process.

Figure 2:
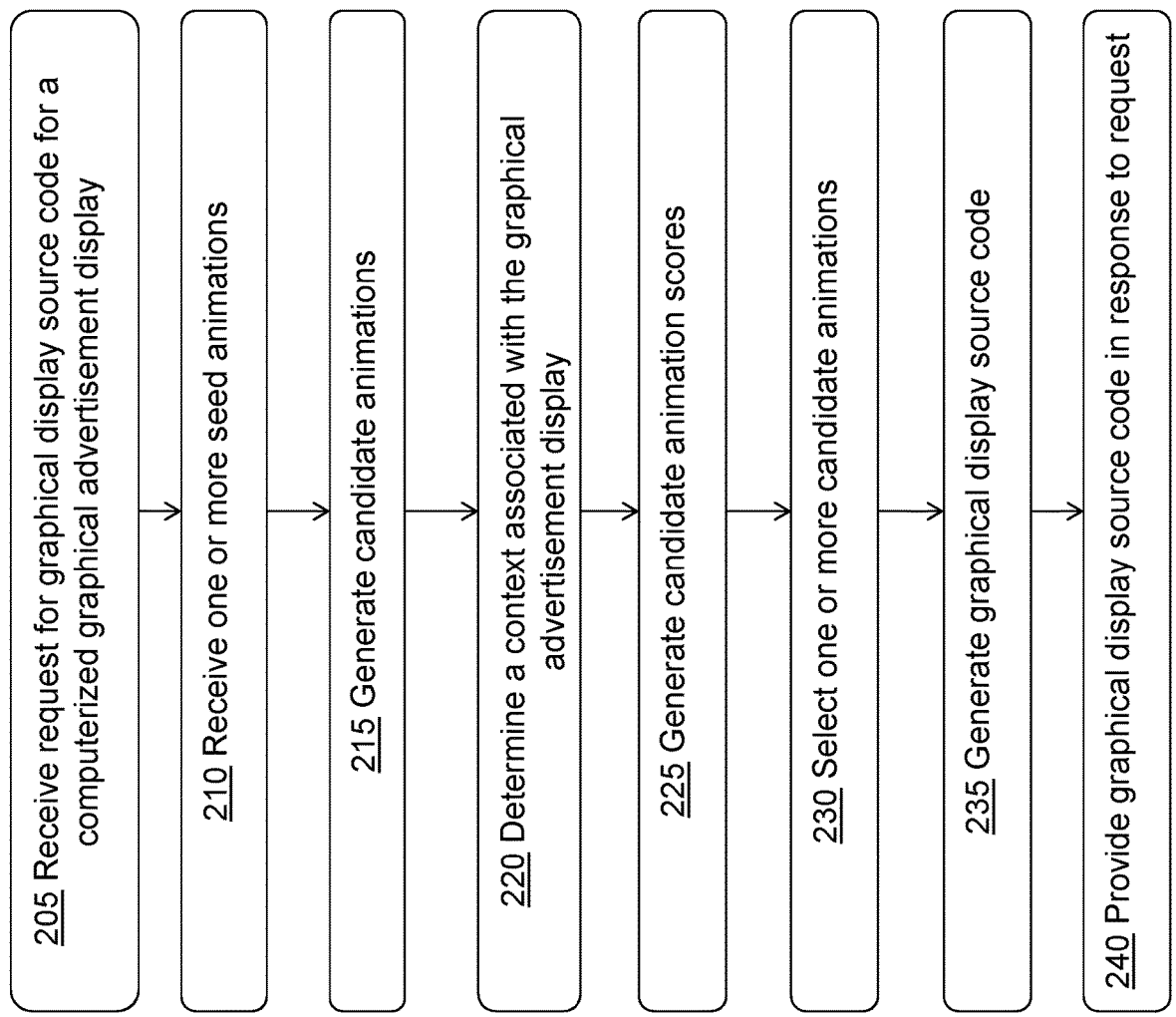
FIG. 2 depicts a flow chart for the generation of graphical display source code for a computerized graphical advertisement display.

FIG. 2 depicts a flow chart for the generation of graphical display source code for a computerized graphical advertisement display. At step 205, an ad system (e.g., ad system 115) receives a request for graphical display source code for a computerized graphical advertisement display. The request can be received from a browser or other application executing on a user device (e.g., browser 105 on user device 102). At step 210, the ad system retrieves one or more seed animations. In some embodiments, the ad system can retrieve the seed animations from system memory or other storage accessible by the ad system. In some embodiments, the ad system can retrieve the seed animations based on display capabilities of the user device. For example, seed animations can be retrieved that are potentially usable based on the resolution, screen size, and/or other display constraints or requirements of the user device.

Each of the seed animations can have associated seed animation features. For example, as described above, the seed animation features can include animation duration, size of animated element, location of animated element, animation frame count, movement direction of animated element, animation metadata, or animation easing. The seed animation features can be, e.g., stored as metadata in a data storage device and retrieved by the ad system 115. In some embodiments, the ad system retrieves the seed animation features at the same time as the seed animation is retrieved.

Figure 3:
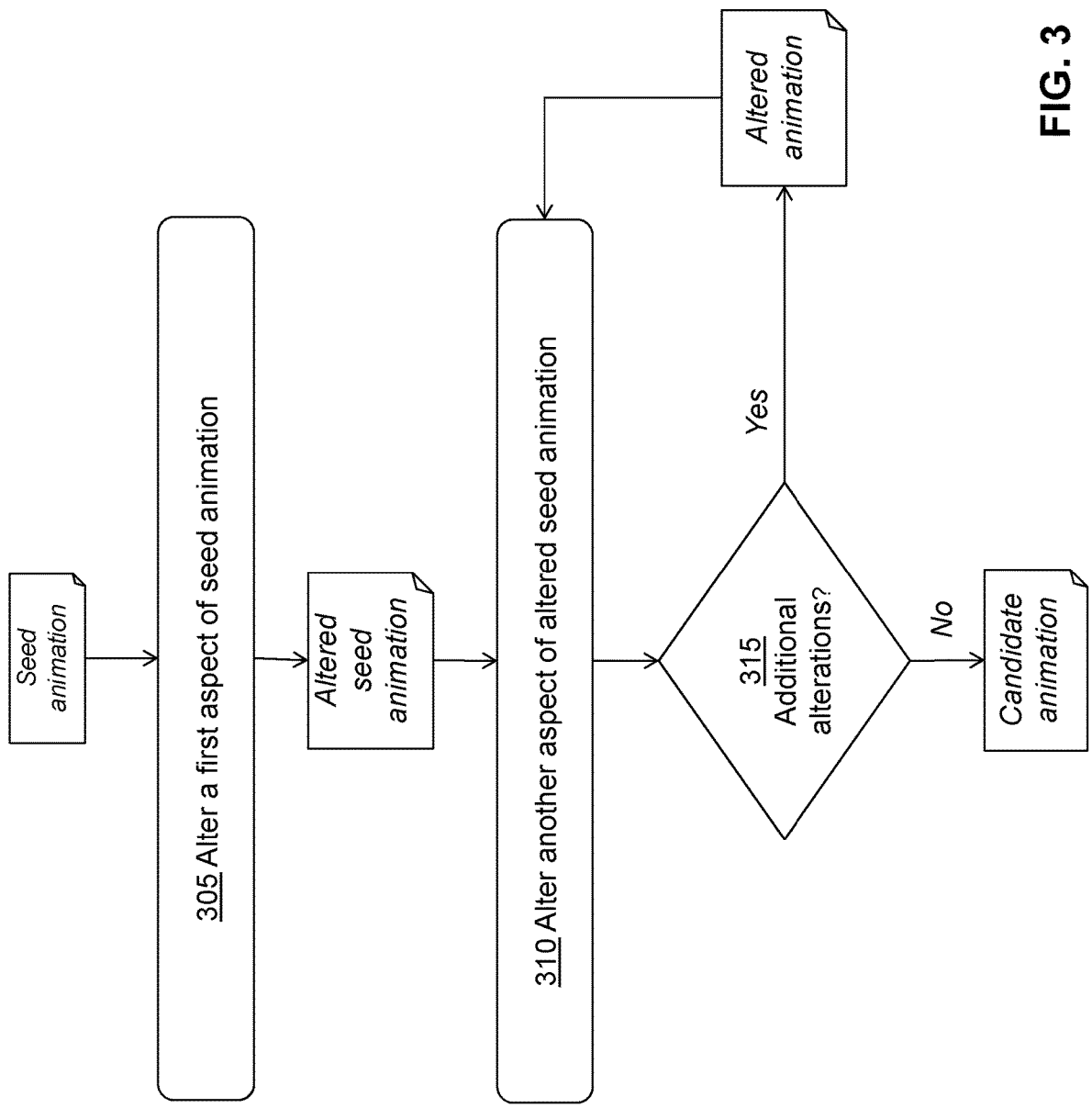
FIG. 3 depicts a flow chart for the generation of candidate animations.

At step 215, the ad system generates candidate animations. In some embodiments, the ad system can generate the candidate animations by altering aspects of one or more of the seed animations. FIG. 3 depicts a flow chart for the generation of candidate animations. At step 305, the ad system receives one or more seed animations and performs a first alteration operation (also called a mutation) on the seed animation(s). An alteration operation can be any operation that can alter one or more aspects of the seed animation(s). The result of the alteration operation on the seed animation is an altered seed animation with associated altered seed animation features. As mentioned above, the operations can include altering the animation duration—e.g., scaling up the animation duration, adding one or more keyframes to the seed animation, or appending animation duration to the seed animation. The operations can include applying one or more easing functions to the animation—e.g., defining a type of easing function to be applied to at least a portion of the animation and assigning a time value at which the easing function(s) are applied to the animation. The operations can include altering the size, position, and/or visual nature of one or more animated elements in the animation—such as defining area, position, angle, opacity, and the like. The operations can include cropping the animated element, applying a filter to the animated element, making the animated element fit to and/or fill a predetermined space, and so forth. The operations can include swapping two different animations and/or animated elements (e.g., so that they animate in different orders or sequences), reversing the movement of an animation (e.g., clockwise to counterclockwise), duplicating an animation so the animation executes more than once, and other similar operations. One of ordinary skill in the art can appreciate that other features and/or attributes of the animation can be altered in addition to those listed above. At least some of the altered seed animation features may have different values than the same features of the seed animation, due to the alteration operation.

At step 310, the ad system performs a second alteration operation, this time on the altered seed animation resulting from step 305. It should be appreciated that the second alteration operation can be the same as the first alteration operation (i.e., add keyframes to the beginning of the animation, then add more keyframes to the beginning of the animation) or the second alteration operation can be different than the first alteration operation (i.e., apply an easing function to a portion of the animation, then change the location of an animated element in the animation). At step 315, the ad system can determine whether to apply additional alteration operations to the intermediate animation. If there are additional alteration operations to perform, the ad system returns to step 310. Once all alteration operations have been performed, the result of the alteration operation(s) is a candidate animation.

In some embodiments, the ad system can generate metadata associated with any of the seed animation(s), intermediate animation(s), and/or candidate animation(s) using instants captured from the respective animation(s). An instant can be a snapshot of a particular frame or point in time during the animation, and the ad system can extract metadata about the animation using the instants. For example, the ad system can determine one or more differences between instants captured from an animation to generate the metadata—e.g., if an animated element appears in the top left corner of the animation at the first instant, then the same animated element appears in the bottom right corner of the animation at the last instant, the ad system can determine the movement of the animated element across the instants. In one embodiment, the ad system can capture a fixed number of instants equally spread along the duration of the animation. In another embodiment, the ad system can capture a number of instants that is proportional to the length of the animation.

It should be appreciated that the ad system can exclude one or more of the resulting altered seed animations generated in step 305 and/or any of the candidate animations generated in step 310. Excluding a generated animation prevents the ad system from using the animation in later steps of the illustrated method. In some embodiments, an animation can be excluded based on a pre-determined constraint on a feature of the animation. For example, the requesting user device (or an application running thereon) can have pre-defined constraints on the size, resolution, processing requirements, or navigation of computerized graphical advertisement displays. Based on these constraints, the ad system can exclude any intermediate animations and/or candidate animations having animation features that would not display properly on the user device. In some embodiments, animations can be excluded by random sampling. For example, the ad system can exclude an animation based on a number generated by a random (or pseudorandom) number generator. In some embodiments, resulting animations can be excluded based on predicted scores associated with candidate animations, such as anticipated performance (e.g., whether the animation is expected to result in an ad that will generate a click or sale).

With reference to FIG. 2, at step 220, the ad system determines a context associated with the computerized graphical advertisement display. As mentioned above, the context can be any attribute that relates to the computerized graphical advertisement display. Exemplary context information can include, but is not limited to characteristics such as a layout description for the computerized graphical advertisement display, a placement of the computerized graphical advertisement display on a website, an application associated with the computerized graphical advertisement display, or one or more features of a user associated with the request for the graphical advertisement display. The ad system can then use the context information when generating candidate animation scores for the candidate animations that result from the workflow in FIG. 3.

At step 225 of FIG. 2, the ad system generates candidate animation scores for one or more of the candidate animations. In one embodiment, the candidate animation score represents an indicator of the expected performance of the advertisement display in which the candidate animation is used. In this embodiment, a candidate animation that has a higher score may be expected to perform better (i.e., have a better conversion rate, have a better interaction probability, or other similar metrics) than a candidate animation that has a lower score.

For example, the ad system can analyze the associated animation features for the candidate animation(s) and determine the score based upon the animation features. In some embodiments, the system can use predictive and/or historical data relating to the context as part of the score generation for a candidate animation. As mentioned above, the predictive and/or historical data can include data elements such as a predicted probability of interaction by a user with a computerized graphical advertisement display that features the candidate animation, an expected sales amount associated with the candidate animation, an expected advertiser margin associated with the candidate animation, and an expected value associated with the candidate animation. It should be appreciated that the context and the predictive and/or historical data can relate to additional characteristics such as the publisher of the advertisement display, the advertiser, and so forth—and the system can use these additional characteristics when generating the score.

In some embodiments, the ad system can generate the score for an animation based on a display context for the computerized graphical display, such as a webpage in which the computerized graphical display will be included. In some embodiments, the ad system can generate the score for a candidate animation based on historical performance data for the candidate animation, such as whether the computerized graphical displays generated using the candidate animation have resulted in clicks and/or sales in the past. In some embodiments, the ad system can generate the score for a candidate animation based on behavioral data for a user associated with the user device, such as prior viewing and purchasing behavior. In some embodiments, the ad system can generate the score for a candidate animation based on a temporal context for the computerized graphical advertisement display, such as the time of day, or a geographical context, such as the location of the user device, for the computerized graphical advertisement display.

It should further be appreciated that the ad system can generate a score for any of a seed animation, an altered seed animation (with one or more mutations applied), and a candidate animation. The ad system analyzes the animation features associated with each type of animation to determine a score for the animation. As described previously, the ad system can filter seed animations, intermediate animations, and/or candidate animations based upon the score associated with the animation.

At step 230, the ad system selects an animation from the candidate animation(s) based on the candidate animation scores. In some embodiments, the ad system can select the candidate animation having the highest animation score. In some embodiments, the ad system can select a candidate animation that does not have the highest animation score. Beneficially, this can prevent the ad system from using the same candidate animation too frequently, and can permit the ad system to test the performance of animations that have not been used frequently. In some embodiments, the ad system can select a candidate animation based on sampling a subset of the plurality of candidate animations, where the subset is determined based on the plurality of candidate animation scores.

As mentioned above, the ad system can alter one or more animation characteristics of the selected candidate animation, where the one or more animation features are independent of the size of the computerized graphical advertisement display and position-independent, based on one or more of a display context for the computerized graphical advertisement display, historical performance data for the selected candidate animation, behavioral data for a user associated with the user device, one or more recommended products for display in the computerized graphical advertisement display, a temporal context for the computerized graphical advertisement display, and a geographical context for the computerized graphical advertisement display. For example, a selected candidate animation can be adapted to a particular layout description of the computerized graphical advertisement display—if a layout description provides for an animation space that is vertical, the ad system can apply an operation on the candidate animation to fit within the vertical space. Other context properties that are relevant include a number of products to be displayed, an absolute and/or relative size of the display, color features of the display, position of the display inside a webpage and/or an application, and so forth.

It should also be appreciated that the ad system can alter the layout description for the computerized graphical advertisement display based upon the selected candidate animation. For example, if the selected animation is horizontal, the layout description can be altered to allocate space for a horizontal animation.

At step 235, the ad system generates graphical display source code based on the selected animation, a size of the computerized graphical advertisement display, and display capabilities of the user device. The graphical display source code can include a reference (e.g., a link or URI) to the selected animation. In some embodiments, the graphical display source code can be HTML code, JAVASCRIPT, CSS, XML, server-side rendered outputs, or a combination thereof. For example, the ad system can use the size of the computerized graphical advertisement display to determine the size and position of the selected candidate animation. The ad system can then generate, e.g., HTML and/or CSS code for such size and position-resolved elements. At step 240, the ad system provides the graphical display source code to the user device in the response to the user device's request. For example, the ad system can transmit the graphical display source code to the user device over a network (e.g., network 130). In some embodiments, the user device can render the graphical display source code to display the computerized graphical advertisement display. For example, a browser on the user device can render the graphical display source code to display the computerized graphical advertisement display as a part of a webpage.

In some embodiments, the ad system can select more than one candidate animation (e.g., at step 230). The ad system can select different candidate animations suitable for display when the user device is in different states. For example, the ad system can select an animation for when the user device is in a horizontal orientation and an animation for when the user device is in a vertical orientation. More generally, different animations can be generated for any state of the user device, such as any aspect of the user device that the user can control dynamically (e.g., size of an advertisement display). The ad system can generate graphical display source code for each of the selected layouts (e.g., at step 235) and provide the graphical display source code for each selected layout to the user device (e.g., step 240). The user device can select graphical display source based on a state of the user device. The user device can render the selected graphical display source code to display the computerized graphical advertisement display.

As mentioned above, it should be appreciated that the ad system can render the animations at any point during the process described herein. In some embodiments, it may be advantageous to render only the selected candidate animation that will be used in the graphical advertisement display (e.g., to conserve processing overhead for real-time ad generation). In other embodiments, it may be advantageous to render intermediate animations (such as the altered seed animations) and/or alternative candidate animations that may not be selected for the current graphical advertisement display, but may be stored and used for subsequent ad requests.

While the above embodiments of the technology generate graphical display source code for a computerized graphical advertisement display, the technology can be used to generate other graphical display data for a computerized graphical advertisement display. For example, the technology can generate image data, or video data. In some embodiments, for example, generated HTML code can be rendered as a video or image and provided to a requesting user device. In some embodiments, generated images and/or graphical display descriptions can be used for video data directly. In some embodiments, an interaction by a user with the video computerized graphical advertisement can include viewing a predetermined portion of the video (e.g., a pre-roll portion) or a click on the video.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific- integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computer-implemented method of generating graphical display source code for a computerized graphical advertisement display, the method comprising:
   receiving, by a computing device, from a user device, a request for the graphical display source code for the computerized graphical advertisement display;
   retrieving, by the computing device, one or more seed animations, each seed animation of the one or more seed animations including a plurality of associated seed animation features;
   generating, by the computing device, a plurality of candidate animations based on at least the one or more seed animations, wherein the computing device alters a first aspect of a seed animation to generate an altered seed animation having a plurality of associated altered seed animation features and the computing device alters a second aspect of the altered seed animation in view of the altered first aspect to generate a candidate animation having a plurality of associated candidate animation features;
   determining, by the computing device, a context associated with the computerized graphical advertisement display;
   generating, by the computing device, a plurality of candidate animation scores, each candidate animation score of the plurality of candidate animation scores associated with a candidate animation of the plurality of candidate animation and each candidate animation score based upon the context and the plurality of associated candidate animation features;
   selecting, by the computing device, an animation from the plurality of candidate animations based on the plurality of candidate animation scores;
   generating, by the computing device, the graphical display source code based on the selected animation, a layout description of the computerized graphical advertisement display, and one or more display capabilities of the user device; and
   providing, by the computing device, to the user device, the graphical display source code.

2. The method of claim 1, further comprising:
   rendering, by the user device, the graphical display source code to display the computerized graphical advertisement display.

3. The method of claim 1, wherein the graphical display source code comprises one or more of HTML, JAVASCRIPT, CSS, XML, or server-side rendered outputs.

4. The method of claim 1, wherein the plurality of associated seed animation features of a seed animation includes one or more of: animation duration, size of animated element, location of animated element, animation frame count, movement direction of animated element, animation metadata, or animation easing.

5. The method of claim 4, wherein altering the animation duration of a seed animation of the one or more seed animations comprises one or more of: scaling up the animation duration, adding one or more keyframes to the seed animation, or appending animation duration to the seed animation.

6. The method of claim 5, wherein appending animation duration to the seed animation comprises one or more of:

adding animation duration to the beginning of the seed animation, adding animation duration to the end of the seed animation, or adding animation duration between one or more keyframes of the seed animation.

7. The method of claim 4, wherein altering the animation duration of a seed animation of the one or more seed animations comprises one or more of: removing one or more animated elements from the seed animation, scaling down the animation duration, merging one or more animated elements in the seed animation, cropping one or more animated elements in the seed animation, or converting one or more animated elements in the seed animation from a first element type to a second element type.

8. The method of claim 1, wherein generating, by the computing device, a plurality of candidate animation scores comprises:
generating, by the computing device, metadata associated with each candidate animation of the plurality of candidate animations; and
determining, by the computing device, the candidate animation score for each candidate animation based upon the generated metadata for the candidate animation.

9. The method of claim 8, wherein generating, by the computing device, metadata associated with each candidate animation of the plurality of candidate animations comprises:
sampling, by the computing device, one or more instants from the candidate animation; and
generating, by the computing device, the metadata based upon the sampled instants.

10. The method of claim 9, wherein the one or more instants are sampled from the candidate animation at pre-determined time intervals.

11. The method of claim 10, wherein the metadata is generated by determining one or more differences between the sampled instants.

12. The method of claim 8, wherein the computing device combines at least a portion of the generated metadata and at least a portion of the sampled metadata.

13. The method of claim 8, wherein the generated metadata comprises exhaustive metadata associated with all characteristics of the candidate animation.

14. The method of claim 13, wherein the sampled metadata is optimized based upon one or more of the exhaustive metadata and the generated metadata.

15. The method of claim 1, wherein the context comprises one or more of: a layout description for the computerized graphical advertisement display, a time constraint associated with the computerized graphical advertisement display, a size of the computerized graphical advertisement display, or an application associated with the computerized graphical advertisement display.

16. The method of claim 1, wherein generating, by the computing device, the plurality of candidate animations based on at least the one or more seed animations comprises:
excluding, by the computing device, one or more candidate animations based on a pre-determined constraint on an associated candidate animation feature.

17. The method of claim 1, wherein generating, by the computing device, the plurality of candidate animations based on at least the one or more seed animations comprises:
excluding, by the computing device, one or more candidate animations by random sampling.

18. The method of claim 1, wherein generating, by the computing device, the plurality of candidate animations based on at least the one or more seed animations comprises:
excluding, by the computing device, one or more candidate animations based on predicted candidate animation scores associated with the one or more candidate animations.

19. The method of claim 1, wherein generating, by the computing device, the plurality of candidate animation scores comprises:
generating, by the computing device, the candidate animation score for a candidate animation based on one or more of: a predicted probability of interaction by a user with a computerized graphical advertisement display that includes the candidate animation, an expected sales amount associated with the candidate animation, an expected advertiser margin associated with the candidate animation, or an expected value associated with the candidate animation.

20. The method of claim 19, wherein the interaction by a user with the computerized graphical advertisement display based on the candidate animation is a click on the computerized graphical advertisement display based on the candidate animation.

21. The method of claim 1, wherein generating, by the computing device, the plurality of candidate animation scores comprises:
generating, by the computing device, the candidate animation score for a candidate animation based on one or more of a display context for the computerized graphical advertisement display, historical performance data for the candidate animation, behavioral data for a user associated with the user device, one or more recommended products for display in the computerized graphical advertisement display, a temporal context for the computerized graphical advertisement display, and a geographical context for the computerized graphical advertisement display.

22. The method of claim 1, wherein selecting, by the computing device, an animation from the plurality of candidate animations based on the plurality of candidate animation scores comprises:
selecting, by the computing device, an animation from the plurality of candidate animations having an animation duration that corresponds to a duration of the computerized graphical advertisement display.

23. The method of claim 1, wherein selecting, by the computing device, an animation from the plurality of candidate animations based on the plurality of candidate animation scores comprises:
selecting, by the computing device, an animation from the plurality of candidate animations having a highest candidate animation score of the plurality of candidate animation scores.

24. The method of claim 1, wherein selecting, by the computing device, an animation from the plurality of candidate animations based on the plurality of candidate animation scores comprises:
selecting, by the computing device, an animation from the plurality of candidate animations having a candidate animation score lower than a highest candidate animation score of the plurality of candidate animation scores.

25. The method of claim 1, wherein selecting, by the computing device, an animation from the plurality of candidate animations based on the plurality of candidate animation scores comprises:
selecting, by the computing device, an animation from the plurality of candidate animations based on sampling a subset of the plurality of candidate animations, wherein the subset is determined based on the plurality of candidate animation scores.

26. The method of claim 1, further comprising:
altering, by the computing device, one or more characteristics of the selected animation, wherein the one or more characteristics are independent of the size of the computerized graphical advertisement display and position-independent, based on one or more of a display context for the computerized graphical advertisement display, historical performance data for the selected animation, behavioral data for a user associated with the user device, one or more recommended products for display in the computerized graphical advertisement display, a temporal context for the computerized graphical display, and a geographical context for the computerized graphical display.

27. The method of claim 1, wherein one or more candidate animations of the plurality of candidate animations are generated by the computing device altering one or more of the plurality of associated candidate animation features of a second candidate animation of the plurality of candidate animations.

28. The method of claim 1, wherein retrieving, by the computing device, one or more seed animations comprises:
selecting, by the computing device, one or more seed animations based on the one or more display capabilities of the user device.

29. The method of claim 1, further comprising:
selecting, by the computing device, a second animation from the plurality of candidate animations based on the plurality of candidate animation scores;
generating, by the computing device, second graphical display source code based on the second animation, the layout description of the computerized graphical advertisement display, and the one or more display capabilities of the user device; and
providing, by the computing device, to the user device, the second graphical display source code.

30. A computerized system for generating graphical display source code for a computerized graphical advertisement display, the computerized system comprising a computing device that:
receives, from a user device, a request for the graphical display source code for the computerized graphical advertisement display;
retrieves one or more seed animations, each seed animation of the one or more seed animations including a plurality of associated seed animation features;
generates a plurality of candidate animations based on at least the one or more seed animations, wherein the computing device alters a first aspect of a seed animation to generate an altered seed animation having a plurality of associated altered seed animation features and the computing device alters a second aspect of the altered seed animation in view of the altered first aspect to generate a candidate animation having a plurality of associated candidate animation features;
determines a context associated with the computerized graphical advertisement display;
generates a plurality of candidate animation scores, each candidate animation score of the plurality of candidate animation scores associated with a candidate animation of the plurality of candidate animation and each candidate animation score based upon the context and the plurality of associated candidate animation features;
selects an animation from the plurality of candidate animations based on the plurality of candidate animation scores;
generates the graphical display source code based on the selected animation, a layout description of the computerized graphical advertisement display, and one or more display capabilities of the user device; and
provides, to the user device, the graphical display source code.

\* \* \* \* \*